US012025954B2

(12) United States Patent
Rey-Mermet

(10) Patent No.: US 12,025,954 B2
(45) Date of Patent: Jul. 2, 2024

(54) MOONPHASE DISPLAY MECHANISM

(71) Applicant: Manufacture d'Horlogerie Audemars Piguet SA, Le Brassus (CH)

(72) Inventor: Gilles Rey-Mermet, Le Sentier (CH)

(73) Assignee: MANUFACTURE D'HORLOGERIE AUDEMARS PIGUET SA, Le Brassus (CH)

( * ) Notice: Subject to any disclaimer, the term of this patent is extended or adjusted under 35 U.S.C. 154(b) by 409 days.

(21) Appl. No.: 17/537,038

(22) Filed: Nov. 29, 2021

(65) Prior Publication Data

US 2022/0171340 A1 Jun. 2, 2022

(30) Foreign Application Priority Data

Nov. 30, 2020 (CH) ...................................... 1526/20

(51) Int. Cl.
*G04B 19/26* (2006.01)

(52) U.S. Cl.
CPC .................................. *G04B 19/268* (2013.01)

(58) Field of Classification Search
CPC .............................. G04B 19/26; G04B 19/268
See application file for complete search history.

(56) References Cited

U.S. PATENT DOCUMENTS

| | | | | |
|---|---|---|---|---|
| 6,885,614 | B2 * | 4/2005 | Rey-Mermet ........ | G04B 19/268 434/284 |
| 9,594,351 | B2 * | 3/2017 | Goeller ................ | G04B 19/268 |
| 10,078,309 | B2 * | 9/2018 | Capt .................... | G04B 19/268 |
| 10,747,179 | B2 * | 8/2020 | Lagorgette ......... | G04C 17/0058 |
| 2006/0221771 | A1 * | 10/2006 | Zimmermann ...... | G04B 19/268 368/16 |
| 2016/0349705 | A1 * | 12/2016 | Goeller ................ | G04B 19/268 |
| 2018/0314209 | A1 * | 11/2018 | Saglini .................. | G04B 19/25 |

(Continued)

FOREIGN PATENT DOCUMENTS

| | | |
|---|---|---|
| EP | 1 701 227 | 9/2006 |
| EP | 2 392 976 | 12/2011 |
| EP | 3 719 585 | 10/2020 |

OTHER PUBLICATIONS

Search Report for CH Application No. 15262020 dated Apr. 15, 2021, 4 pages.

*Primary Examiner* — Edwin A. Leon
*Assistant Examiner* — Jason M Collins
(74) *Attorney, Agent, or Firm* — NIXON & VANDERHYE

(57) ABSTRACT

A display mechanism for n moonphases for a timepiece, where n≥3, includes a first wheel and pinion having a night-time background and a portion of lunar background and a second wheel and pinion superposed on the first, the second having a night-time background and moonphase profiles, with the first and second pivoting about one axis. The first wheel and pinion is driven at a constant velocity, and that the second can be driven in rotation at the same velocity and direction as the first during a moonphase display period during which a portion of lunar background of the first and a moonphase profile of the second corresponding to the moonphase to be displayed are superposed, revealing the moonphase. The second wheel and pinion is offset from the first by a repositioning angle during a transitional period between the current and following display periods, revealing the following moonphase.

20 Claims, 12 Drawing Sheets

(56) References Cited

U.S. PATENT DOCUMENTS

| | | | | |
|---|---|---|---|---|
| 2019/0146414 | A1* | 5/2019 | Zaugg | G04B 19/268<br>368/16 |
| 2021/0191331 | A1* | 6/2021 | Debaud | G04F 7/0866 |
| 2021/0191332 | A1* | 6/2021 | Tortora | G04B 45/0007 |
| 2021/0208539 | A1* | 7/2021 | Papi | G04B 19/268 |

* cited by examiner

MOONPHASE DISPLAY MECHANISM

CROSS-REFERENCE TO RELATED APPLICATIONS

This application claims priority to Swiss Patent Application No. 01526/20 filed Nov. 30, 2021, the entire contents of which are hereby incorporated by reference.

BACKGROUND OF THE INVENTION

Field of the Invention

The present invention relates to a moonphase display mechanism for a timepiece, comprising a first wheel and pinion having a night-time background and at least one portion of lunar background and a second wheel and pinion superposed on the first wheel and pinion, said second wheel and pinion having a night-time background and moonphase profiles.

The present invention also relates to a timepiece comprising such a display mechanism.

Description of the Related Art

Such a moonphase display mechanism is for example described in the applicant's published patent application EP 2 392 976. In said document, the moonphase display mechanism comprises a first moon disc comprising two light-coloured circles symbolising the moon inscribed on a dark background symbolising the night-time sky. The dial comprises an aperture which may be used, in cooperation with the moon disc, to indicate moonphases with concave-shaped symbols.

It is possible to use a second disc which is superposed on the moon disc and comprises a night-time background and apertures having various moonphase profiles. In this design, this second disc is arranged to function as an occulting disc cooperating with the first moon disc and optionally with the aperture to occult the circles symbolising the moon so as to indicate moonphases in particular with convex-shaped symbols.

The moon disc is driven in rotation to rotate by 180° per period of lunation such that, in conventional manner, the user follows the daily development of the various moonphases from the new moon appearing on the left of the aperture to the last crescent appearing on the right of the aperture over the course of a lunation. A programme wheel is provided to advance the moon disc each day and to rotate the occulting disc only at the time of a moonphase change so as to occult differently one of the moons represented on the moon disc. The occulting disc then remains stationary until it next rotates.

This mechanism makes it possible to obtain a moonphase display on a timepiece which corresponds to the actual appearance of the moonphases for the entire duration of the lunation by displaying all the waxing and waning phases of the portion of the moon's illuminated surface visible from the earth.

Numerous variant embodiments are described. However, none of these variants makes it possible to achieve a moonphase display which displays at once all the waxing and waning phases of the portion of the moon's illuminated surface visible from the earth against a sky background of large dimensions, behind a horizon independent of the displayed moon profile.

Furthermore, the configuration of the apertures means that the terminators of the various moonphases displayed cannot be made to look realistic.

It is an object of the present invention to remedy these drawbacks by proposing a new, original moonphase display for a mechanical timepiece, which makes it possible to display all the waxing and waning phases of the portion of the moon's illuminated surface visible from the earth, with a realistic terminator, against a sky background of large dimensions, behind a horizon independent of the displayed moon profile.

SUMMARY OF THE INVENTION

To this end, the invention relates to a display mechanism for n moonphases for a timepiece, where n is preferably an odd integer greater than or equal to 3, comprising a first wheel and pinion having a night-time background and at least one portion of lunar background and a second wheel and pinion superposed on the first wheel and pinion, said second wheel and pinion having a night-time background and moonphase profiles and the first and second wheels and pinions being pivoted about one and the same axis.

According to the invention, said display mechanism is arranged such that the first wheel and pinion is capable of being driven in rotation at a constant velocity, and that the second wheel and pinion is capable of being driven in rotation at the same angular velocity and in the same direction as the first wheel and pinion during a moonphase display period during which a portion of lunar background of the first wheel and pinion and a moonphase profile of the second wheel and pinion corresponding to the moonphase to be displayed are superposed to reveal said moonphase, and such that the second wheel and pinion is offset in relation to the first wheel and pinion by a repositioning angle during a transitional period between the current display period and the following display period in order to be able to reveal the following moonphase.

Advantageously, the first wheel and pinion is arranged to be drivable by a drive gear train and to cooperate with a drive device, said drive device being arranged to drive the second wheel and pinion synchronously during the moonphase display period and to drive it in relative rotation in order to offset it by said repositioning angle during a transitional period.

Thus, since the moonphase to be displayed is revealed by the superposition of a portion of lunar background of the first wheel and pinion with a moonphase profile of the second wheel and pinion, the display mechanism according to the invention makes it possible to select the moonphase profiles so as to be able realistically to display all the waxing and waning phases of the portion of the moon's illuminated surface visible from the earth.

Advantageously, said display mechanism comprises a dial including a display aperture of dimensions selected to show the movement of a moonphase during at least part of its display period. More specifically, the display aperture is of dimensions selected to display at any time at most one moonphase in said aperture.

The movement of the moonphase is accordingly more visible to the user of the timepiece.

Preferably, the display aperture of the dial has a substantially annular shape, the radial edges of which form a horizon line. Advantageously, the first and second wheels and pinions are capable of rotating in clockwise direction so as to represent the movement of a moonphase between its rising and setting on the horizon.

Thus, the moonphase profiles appearing on the second wheel and pinion are revealed independently of the edges of the display aperture, such that the various moonphases appear to move against a sky background defined by the edges of the aperture, the radial edges being able to form a customisable horizon line.

Preferably, the moonphase profiles of the second wheel and pinion have a profile defined by the terminator corresponding to a moonphase and the arc of a circle of the outer edge of the moon. Advantageously, the edge of the moonphase profile corresponding to the terminator comprises relief features illustrating details of the moon.

A realistic representation of the various moonphases is accordingly obtained.

The present invention also relates to a timepiece comprising a moonphase display mechanism as defined above.

BRIEF DESCRIPTION OF THE DRAWINGS

Other features and advantages of the present invention will become apparent from reading the following detailed description of various embodiments of the invention provided by way of non-limiting example, the description being made with reference to the appended drawings in which.

DESCRIPTION OF THE PREFERRED EMBODIMENTS

The present invention relates to a moonphase display mechanism for a timepiece and to a timepiece, and more particularly a mechanical timepiece, comprising such a display mechanism.

Figure 1:
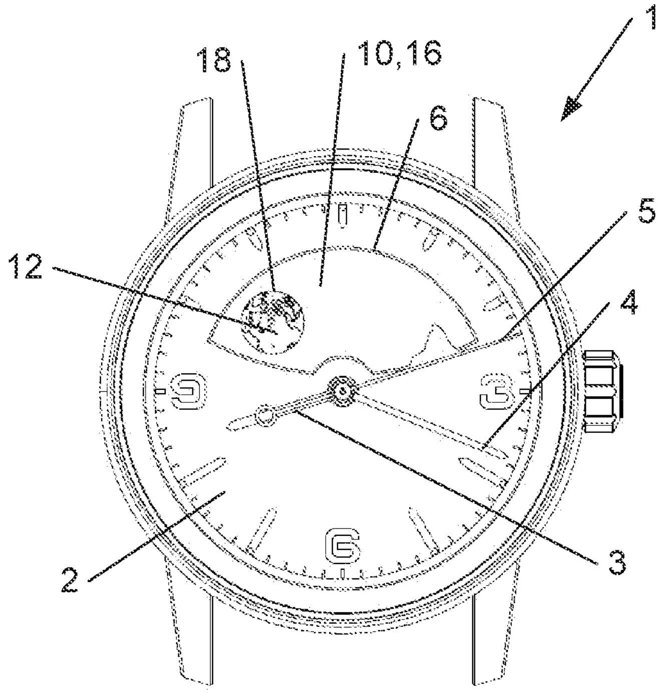
FIG. 1 is a plan view of a timepiece according to the invention displaying the full moon.

FIG. 1 shows such a timepiece 1, and more particularly a wristwatch comprising in particular a dial 2 and set of hands 3, 4, 5 in the centre of the dial 2, for indicating the time in the conventional manner.

Figure 2:
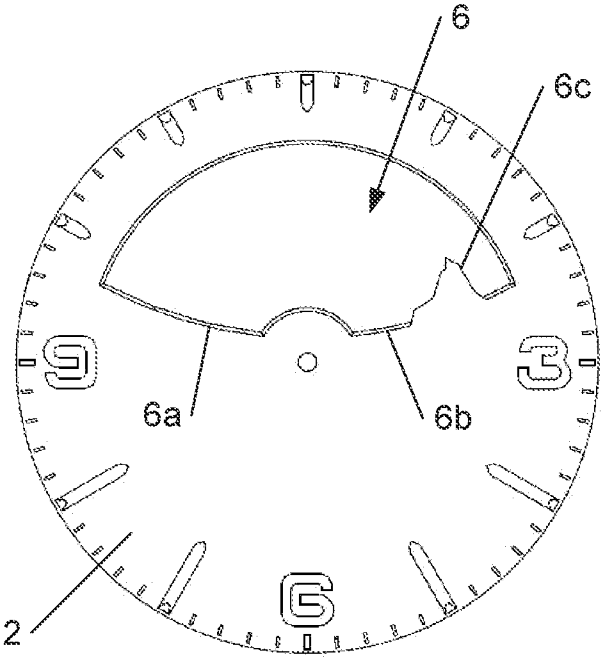
FIG. 2 is a plan view of the dial used in the invention.

The moonphase display mechanism comprises a dial, here constituted by the dial 2 for indicating the watch times. This dial 2, as depicted in FIG. 2, has a display aperture 6 which will be described in greater detail below. It is quite obvious that the moonphase display dial may differ from the time display dial by being arranged in a selected zone of said time display dial of the watch.

Figure 3:
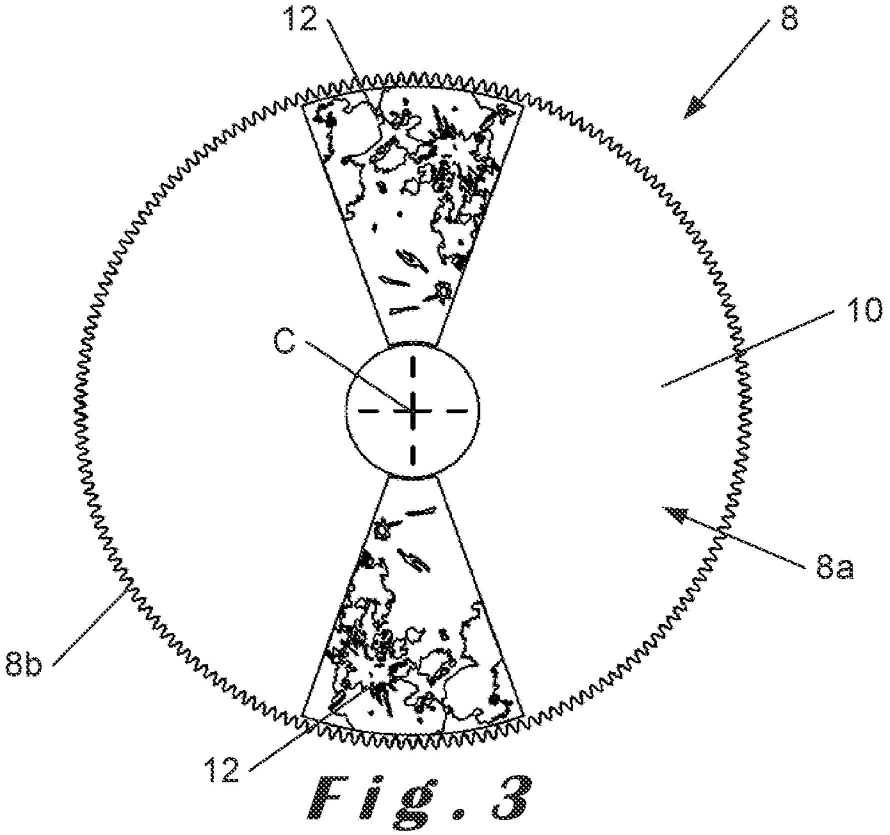
FIG. 3 is a plan view of the first wheel and pinion used in the invention.

With reference to FIG. 3, the moonphase display mechanism comprises a first wheel and pinion 8 in the form of a disc with a centre C, comprising a plate 8*a* and external teeth 8*b*. The plate 8*a* has a night-time background 10 and at least one portion of lunar background 12. Preferably, the night-time background 10 occupies the largest area of the plate 8*a*, the remaining area being occupied by the lunar background portion(s). Preferably, the night-time background 10 is a decorative motif representing the sky at night.

Advantageously, the first wheel and pinion 8 has x lunar background portions 12, x being greater than or equal to 1 and less than n, said x lunar background portions 12 being regularly distributed on the first wheel and pinion 8 and separated from one another by the night-time background 10. The lunar background portions are decorative motifs representing a lunar surface selected to be adaptable to all the possible configurations corresponding to the various moonphases to be displayed. The lunar decorative motif may be reproduced by decal, printing, gravure or any other appropriate technique.

Figure 4:
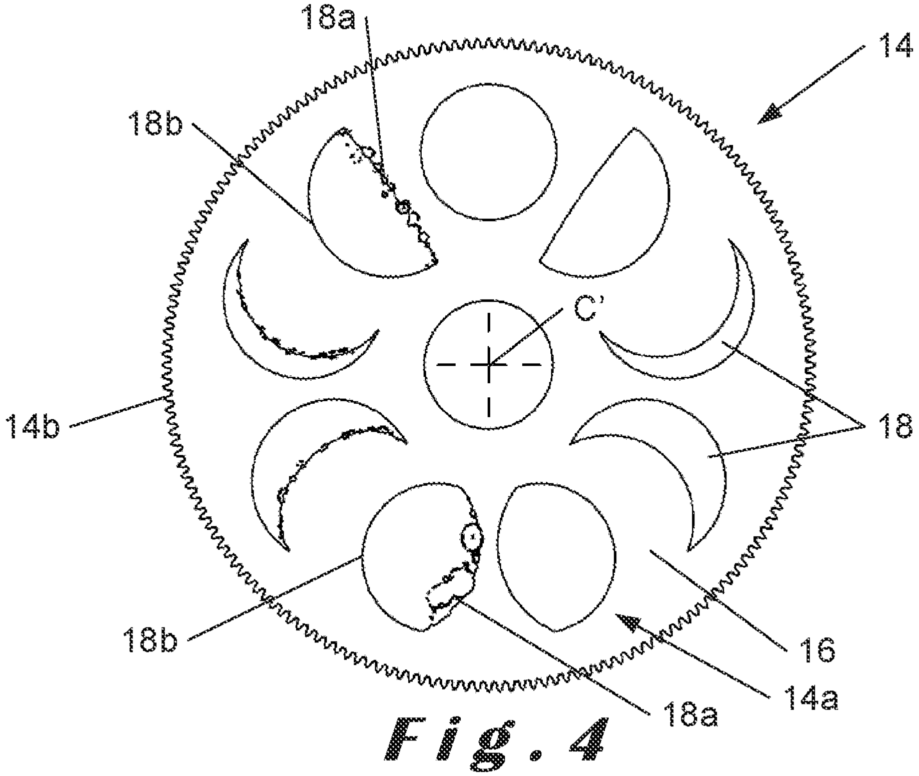
FIG. 4 is a plan view of the second wheel and pinion used in the invention.

With reference to FIG. 4, the moonphase display mechanism comprises a second wheel and pinion 14 in the form of a disc with a centre C', comprising a plate 14*a* and external teeth 14*b*. The plate 14*a* has a night-time background 16 and an odd number n of moonphase profiles 18. Said second wheel and pinion 14 is superposed coaxially on the first wheel and pinion 8 along an axis passing through C and C', i.e. positioned above the first wheel and pinion 8, as viewed by a user looking at the dial 2.

The night-time background 16 of the second wheel and pinion 14 is preferably identical, or at least of similar appearance, to the night-time background 10 of the first wheel and pinion 8, such that they merge into one another when the night-time background 10 of the first wheel and pinion 8 appears in the moonphase profiles 18 of the second wheel and pinion 14 in order to prevent said moonphase profiles 18 from appearing when they are not superposed on a lunar background 12.

The moonphase profiles 18 represent the various phases of waxing and waning of the portion of the moon's illuminated surface visible from the earth. More particularly, the moonphase profiles 18 are configured to be capable of representing all the waxing and waning phases of the portion of the moon's illuminated surface visible from the earth, for example by a concave shape for the first and last crescents, a D shape for the first quarter and a reversed D for the last quarter, a circular shape for the full moon and a convex shape for the waxing and waning gibbous moons.

The moonphase profiles 18 may be formed by openings made in the plate 14*a* of the second wheel and pinion 14 comprising the night-time background 16. It is also possible to provide a solid second wheel and pinion 14, for which at least the portions in which the moonphase profiles 18 are represented are at least translucent, and preferably transparent. It is in particular possible to create gradients in the levels of transparency in order to impart a spherical effect to the revealed moon. For example, at least said portions, and preferably the second wheel and pinion 14, may be made of sapphire or glass provided with a polarising layer. The night-time background 16 is formed by depositing, around the moonphase profiles 18, a thin applied or textured layer, preferably on the lower face of the plate 14*a* of the second wheel and pinion 14, in order to minimise the parallax effect between the first and second wheels and pinions 8, 14.

Advantageously, the moonphase profiles 18 have a profile corresponding to the shape of the illuminated surface of the moon, defined by the terminator 18*a* corresponding to the various moonphases which it is desired to be able to display and an arc of a circle 18*b* corresponding to the outer edge of the moon. Advantageously, the edge of the moonphase profile corresponding to the terminator comprises relief features illustrating details of the moon. Accordingly, details of craters or seas, in particular those visible under glancing sunlight, can be formed by cutting or drawing on the edge of the moonphase profile corresponding to the terminator.

Advantageously, as shown in FIG. 3, the lunar background portions 12 provided on the first wheel and pinion 10 are in the form of circular sectors of an angle substantially equal to 360/n°, regularly distributed on the plate 8*a* of the first wheel and pinion 8 and separated from one another by the night-time background 10, while n juxtaposed and regularly distributed circular sectors, of an angle equal to 360/n°, are provided on the plate 14*a* of the second wheel and pinion 14 in order to represent the n moonphases to be displayed.

In accordance with the invention, the display mechanism of the n moonphases is arranged such that said first and second wheels and pinions 8, 14 are pivoted about one and the same axis, here the central axis, perpendicular to the first and second wheels and pinions 8 and 14 passing through C and C'. The first wheel and pinion 8 is capable of being driven in rotation at a constant velocity by the movement. The mechanism is arranged such that the second wheel and pinion 14 is driven in rotation at the same velocity and in the same direction as the first wheel and pinion 8 during a moonphase display period during which a portion of lunar background 12 of the first wheel and pinion 8 and a moonphase profile 18 of the second wheel and pinion 14 corresponding to the moonphase to be displayed are superposed to reveal said moonphase, and such that said second wheel and pinion 14 is offsettable in relation to the first wheel and pinion 8 by a repositioning angle during a transitional period between the current display period and the following display period in order to be able to reveal the following moonphase.

The moon accordingly describes a lunation cycle of 29.5 days in n steps of 29.5/n days during which the displayed moonphase obtained by conjunction of the second wheel and pinion 14 with the first wheel and pinion 8 does not change, but moves regularly with the night-time background. With or without a display aperture 6, the position of the moonphase displayed on the dial 2 indicates to the user the state of progress of the displayed moonphase (start, middle or end of the phase). Then, advantageously, the moonphase displayed disappears to permit the following moonphase to appear, over 29.5/n days.

Advantageously, the display aperture 6 has dimensions selected to allow the movement of a moonphase to appear for at least part of its display period. More particularly, the display aperture 6 is of dimensions selected to display at any time at most one moonphase in said aperture 6. Furthermore, the display aperture 6 is of dimensions selected such that the remaining area of the dial 2 masks the offset between the first and second wheels and pinions 8, 14 during the transitional period. Since the moonphase profiles 18 are independent of display aperture 6 but also independent of one another, each of the moonphase profiles 18 can occupy the same area of the circular sector of the plate 14*b* of the second wheel and pinion 14. Consequently, each of the moon profiles 18 appears in a large size in a display aperture which is widened in relation to a standard moonphase display aperture.

Advantageously, the display aperture 6 has a substantially annular shape which is coaxial with the first and second wheels and pinions 8, 14, and the radial edges 6*a*, 6*b* of which form a horizon line. At least one of the radial edges 6*a*, 6*b* of the display aperture 6 may have a shape selected to represent for example the profile of a mountain 6*c*, a monument or a city on the horizon, which is customisable in line with the user's wishes or the place of purchase of the timepiece. This foreground formed by a horizon line makes it possible to create a contrast with the moonphase displayed in the sky, giving the impression of a large moon.

Preferably, the first and second wheels and pinions 8, 14 are capable of rotating in clockwise direction so as to represent the movement of a moonphase on the horizon between rising in the east, on the left of the display aperture 6, and setting in the west, on the right of the display aperture 6.

Advantageously, the first wheel and pinion 8 is arranged to be drivable at a constant velocity by a drive gear train (not shown) of the timepiece and to cooperate with a drive device, said drive device being arranged to drive the second wheel and pinion 14 synchronously during the moonphase display period and to drive it in relative rotation in order to offset it by said repositioning angle during a transitional period.

Advantageously, the moonphase profiles 18 of the second wheel and pinion 14 are positioned in relation to one another depending on the selected direction of relative rotation of the second wheel and pinion 14 in relation to the first wheel and pinion 8, such that the following moonphase is displayed instead of the current moonphase when the second wheel and pinion 14 is driven in relative rotation in relation to the first wheel and pinion 8 by the drive device in said selected direction of rotation during the transitional period.

Since the number x of lunar background portions 12 on the first wheel and pinion 8 may be greater than or equal to 1, said first and second wheels and pinions 8, 14 are arranged to be offsettable in relation to one another by said repositioning angle during the transitional period between the current moonphase display period and the following moonphase display period.

In the embodiment presented, the offset between the two wheels and pinions 8 and 14 occurs after the moonphase which was being displayed is hidden below the horizon in the west, so as to make the following moonphase appear in the east.

Preferably, the moonphase profiles 18 of the second wheel and pinion 14 are positioned in relation to one another such that the repositioning angle is equal to 360/2n°.

According to a first embodiment, the drive device comprises an energy accumulator arranged to be driven by the first wheel and pinion 8 which is itself driven by the drive gear train, and arranged to cause the second wheel and pinion 14 to jump forward under the action of said energy accumulator during the transitional period.

Such a drive device is for example shown in FIGS. 5 to 8.

In this first embodiment, the drive device with energy accumulator 20 comprises three wheels coaxially superposed along an axis parallel to the central axis, namely a first toothed wheel 22 arranged to be driven by the first wheel and pinion 8 by means of its external teeth 8*b*. Said first wheel 22 is integral with a cam 24 which here for example comprises four sectors.

The drive device with energy accumulator 20 also comprises a second toothed wheel 26 arranged also to be driven by said first wheel and pinion 8 via its external teeth 8*b*, but at a higher velocity than the first wheel 22. To this end, said first and second wheels 22 and 26 comprise a different number of teeth. Said second wheel 26 bears a pin or peg 28, the role of which is described below.

The drive device with energy accumulator 20 also comprises a third toothed wheel 30 arranged to drive the second wheel and pinion 14 via its external teeth 14*b*. Said third wheel 30 comprises a groove 32 in which the pin or peg 28 of the second wheel 26 engages, such that the angular freedom of the third wheel 30 in relation to the second wheel 26 is limited by said groove 32 by an abutment effect of said groove 32 with the pin 28.

Furthermore, the third wheel 30 bears a jumper 34 mounted pivotally and equipped with a jumper spring 36, said jumper 34 being arranged to cooperate with the cam 24 of the first wheel 22. To this end, the jumper 34 may have at its free end a roller or runner 38 extending through the third wheel 30 through an opening 39 provided in the plate of said third wheel 30, said roller 38 being arranged to cooperate with the profile of the cam 24. Accordingly, the jumper 34, working under tension with the cam 24, allows the third wheel 30 to be caused to rotate integrally with the first wheel 22 for synchronised drive of the first and second wheels and pinions 8, 14 while the pin 28 of the second wheel 26 is not in abutment in the groove 32 of the third wheel 30. The difference in velocity between the first and second wheels 22, 26 creates an angular offset by being driven by the wheel and pinion 8 which meshes with the two wheels 22 and 26, such that the pin 28 of the second wheel 26 moves freely in the groove 32 of the third wheel 30. Said pin 28 arriving in abutment in the groove 32 causes the third wheel 30 to rotate integrally with the second wheel 26, such that the jumper 34, forced to move along the profile of the cam 24, stores energy by means of its spring 36. The profile of the cam 24 is selected such that the roller 38 of the jumper 34 is in the bottom of a concavity in said profile of the cam 24 during the synchronised drive phase of the two wheels and pinions 8 and 14 until the pin 28 comes into abutment in the groove 32. When the jumper 34 reaches the apex of one of the sectors of the profile of the cam 24, it drops down from this apex to cooperate with the following sector, such that said energy is suddenly released so as to cause the third wheel 30 to pivot and enable it to jump so as to drive the second wheel and pinion 14 in rotation by the repositioning angle via its external teeth 14*b*, during a transitional period. A person skilled in the art knows how to calculate the number of teeth and the dimensions of the various elements of the drive device 20 in order to obtain the necessary repositioning angle.

The operation of this first embodiment of the drive device 20 is set out in detail below, more particularly with reference to FIGS. 5, 9, 9*a* to 12, 12*a*, and in relation to a preferred embodiment of the moonphase display mechanism according to the invention.

According to this preferred embodiment, the first wheel and pinion 8 comprises two lunar background portions 12 symmetrically opposed in relation to the central axis, as shown in FIG. 3, and is capable of being driven by the drive gear train (not shown) of the timepiece at a constant velocity of n half-revolutions per lunation. This rotational velocity is obtained by means of a moon drive gear familiar to a person skilled in the art.

According to the preferred embodiment, n is equal to 9, such that the first wheel and pinion 8 is arranged to be driven continuously in clockwise direction by the drive gear train at a constant velocity of 9 half-revolutions per lunation.

Figure 5:
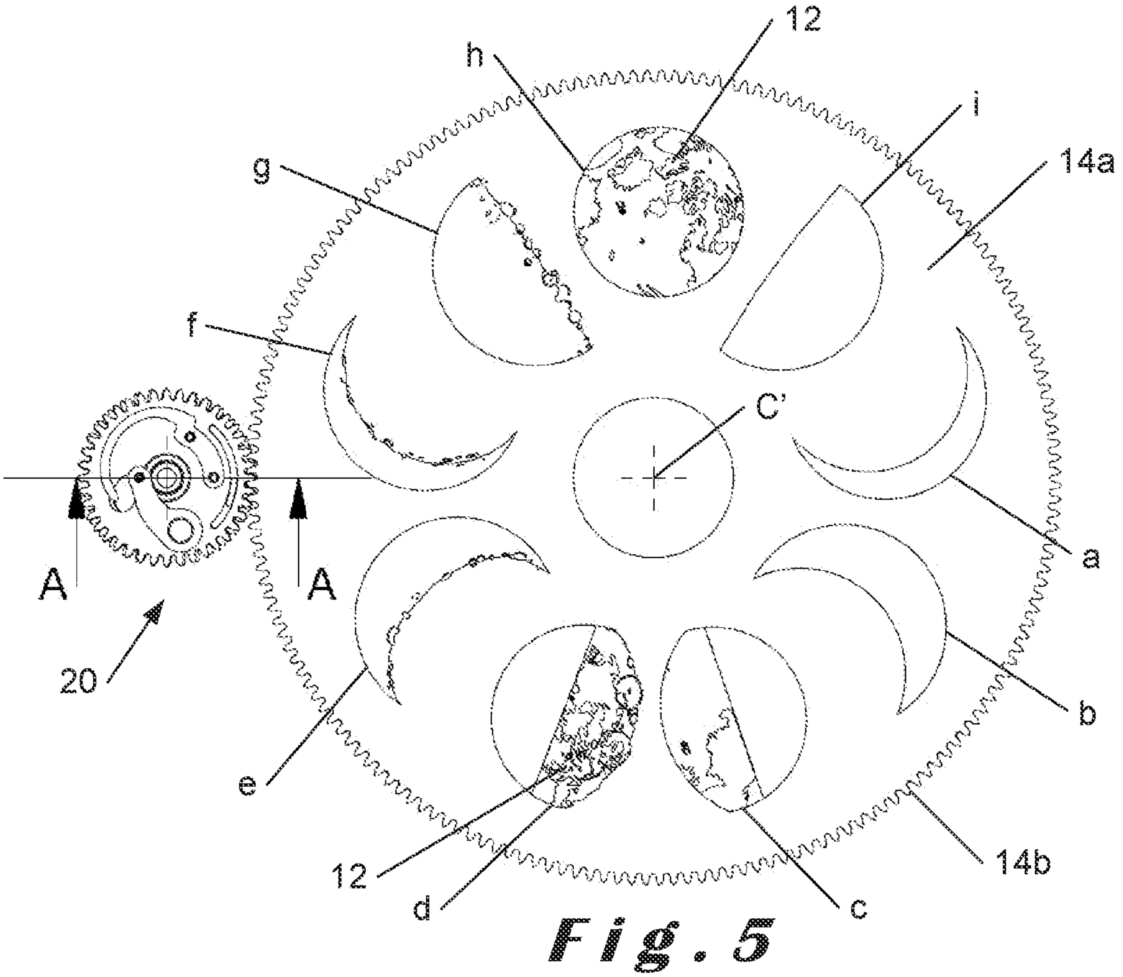
FIG. 5 shows a plan view of the first and second wheels and pinions and of a first variant embodiment of a drive device.
Figure 6:
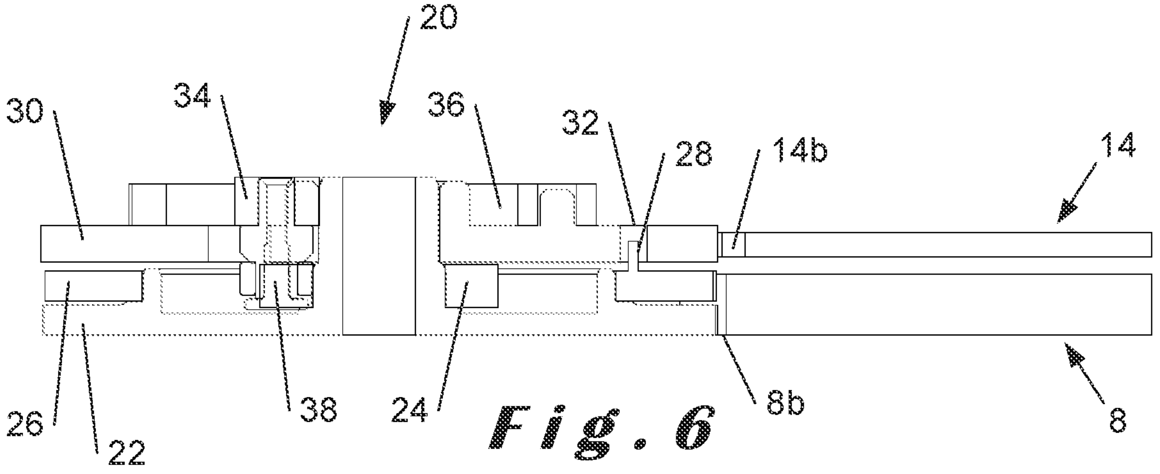
FIG. 6 is a sectional view according to AA of FIG. 5.
Figure 7:
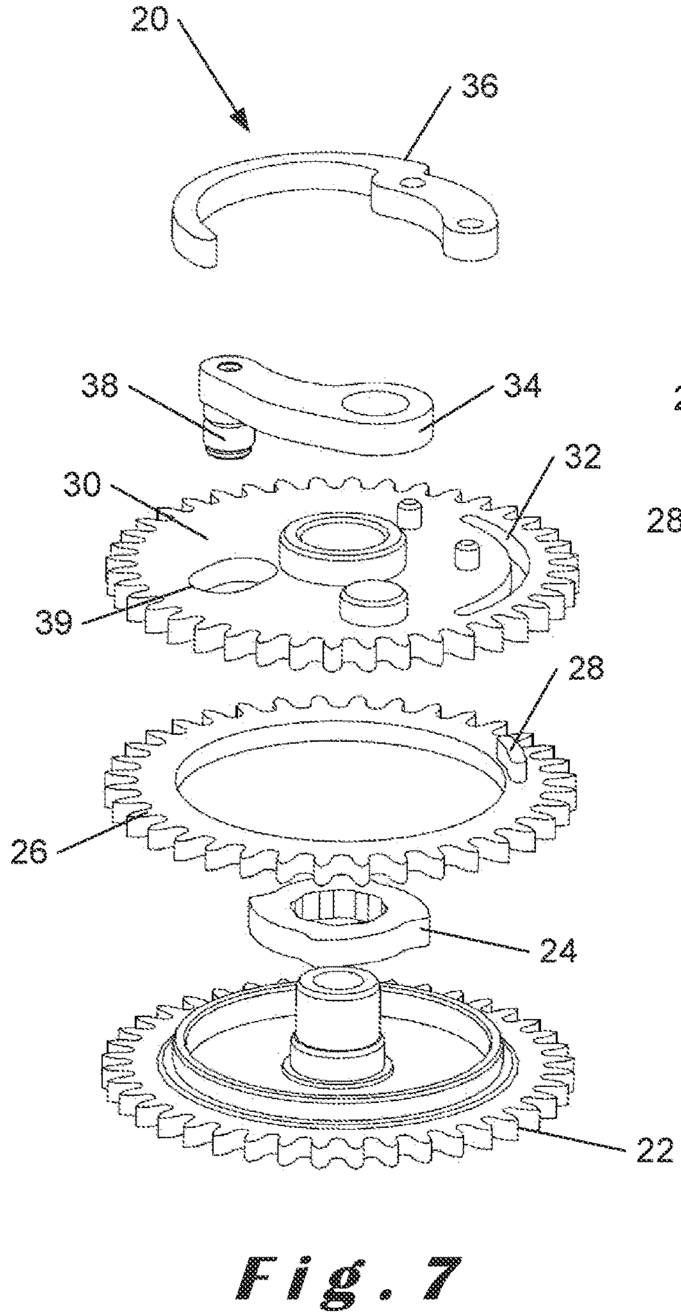
FIGS. 7 and 8 are respectively an exploded view and a plan view of the drive device of FIG. 5.
Figure 8:
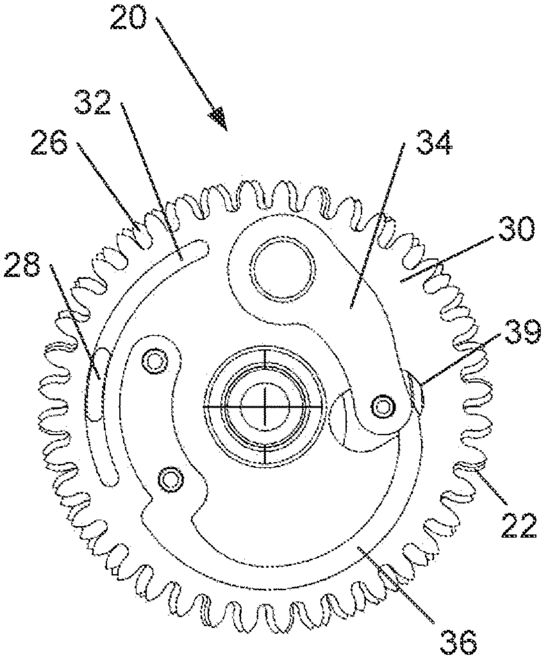

The second wheel and pinion 14 comprises 9 moonphase profiles 18 which are arranged according to the sequence, in clockwise direction, first crescent a, waning moon b, waning gibbous moon c, waxing gibbous moon d, waxing moon e, last crescent f, last quarter g, full moon h, first quarter i, each occupying a circular sector of 40° (360/9), as shown in FIG. 5.

The display aperture 6, which is annular and coaxial with the first and second wheels and pinions 8, 14, extends over an angle of approximately 140°.

The drive device 20 is arranged to drive the second wheel and pinion 14 synchronously at the same velocity as the first wheel and pinion 8 during the moonphase display period, and to drive it in relative rotation, thanks to the energy accumulator, in order to offset it by the necessary repositioning angle during a transitional period.

Thanks to the energy accumulator, the second wheel and pinion 14 is offset in clockwise direction by a repositioning angle of 20° (360/2*9) during a transitional period between one moonphase display period and the following moonphase display period, the moonphase display period being approximately 3.28 days (29.5/9).

The drive device with its energy accumulator 20 is shown in FIG. 5 on the left of the superposed first and second wheels and pinions 8 and 14. Quite clearly, it can be positioned at any other location on the periphery of said wheels and pinions 8 and 14.

With more particular reference to FIGS. 9, 9*a* to 12, 12*a*, the operation of the drive device with energy accumulator 20 is explained below in relation to the full moon h.

Figure 9:
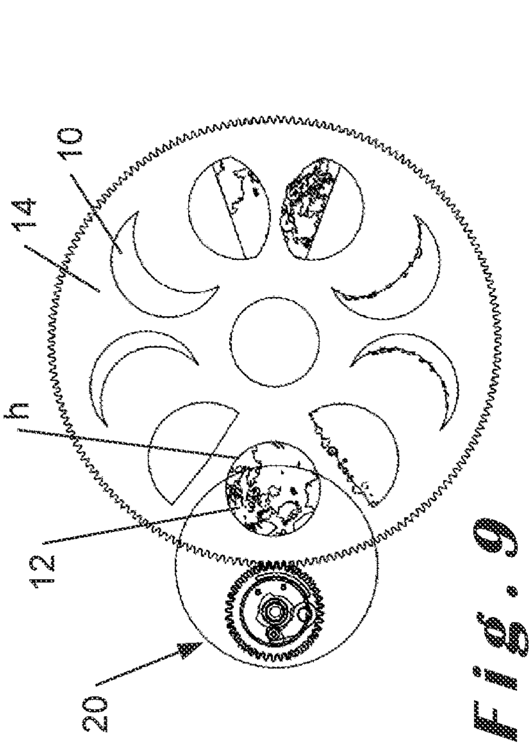
FIGS. 9 to 12 show the two wheels and pinions and the first embodiment of the drive device according to various movement sequences during the display period of the full moon and during the transitional period between the full moon and the waning gibbous moon, FIGS. 9*a* to 12*a* being detail views of FIGS. 9 to 12 respectively.
Figure 9A:
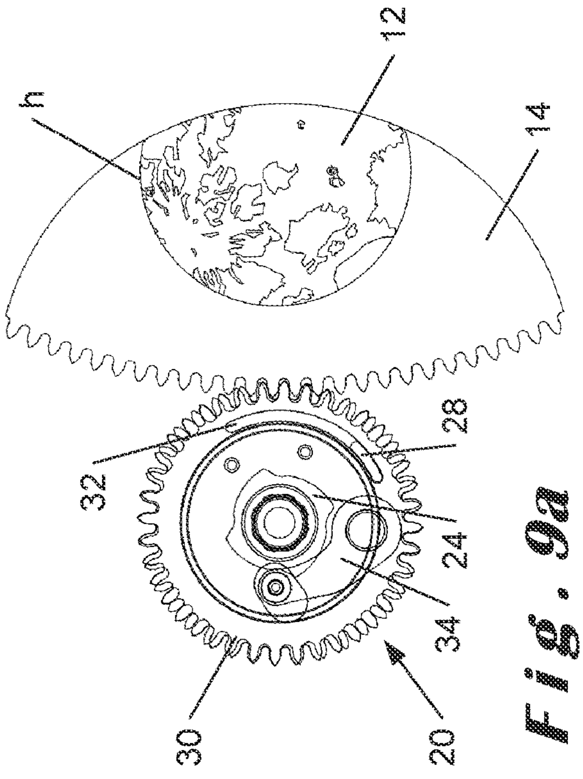

As depicted in FIG. 9, the first wheel and pinion 8 and the second wheel and pinion 14 are positioned such that the moonphase profile 18 of the second wheel and pinion 14 corresponding to the full moon h is superposed on a portion of lunar background 12 of the first wheel and pinion 8 so as to reveal the full moon, on the left of the display aperture 6 (not shown in these figures), corresponding to the east. The other moonphase profiles 18 which are located in the display aperture 6 are superposed on the night-time background 10 of the first wheel and pinion 8 such that they are not visible, the night-time background 10 of the first wheel and pinion 8 which appears through said moonphase profiles 18 merging with the night-time background 16 of the second wheel and pinion 14. The other moonphase profiles 18, and in particular those through which the other portion of lunar background 12 on the other side of the central axis appears, are masked under the display aperture 6. They are therefore not visible to the user.

During the moonphase display period in the display aperture 6, the drive device with energy accumulator 20 drives the first and second wheels and pinions 8 and 14 at the same velocity of 0.5×9 revolutions/29.5 days. To this end, as FIG. 9*a* more specifically depicts, the third wheel 30 rotates integrally with the first wheel 22 due to the jumper 34, its roller 38 being pressed by the spring 36 into the bottom of a concavity in the profile of the cam 24. The first wheel and pinion 8 driven by the drive gear train of the base movement at the constant velocity of 0.5×9 revolutions/29.5 days drives the first wheel 22 of the drive device 20 via its external teeth 8*b* and therefore the third wheel 30 which meshes with the second wheel and pinion 14, such that the latter rotates synchronously with the first wheel and pinion 8, at the same velocity of 0.5×9 revolutions/29.5 days and in the same direction. The two wheels and pinions 8 and 14 rotate together such that the full moon displayed in the display aperture 6 moves in said aperture 6, against a night-time background, constituted by the night-time background 10 of the first wheel and pinion 8 which appears through the moonphase profiles 18 which appear in the aperture 6 and the night-time background 16 of the second wheel and pinion 14, in clockwise direction, from left to right (from east to west), for 3.28 days (29.5/9). Over a little less than a half-revolution of the wheel and pinion, the pin 28 of the second wheel 26, which rotates faster than the first and third wheels 22, 30, is offset unrestrained in the groove 32 of the third wheel 30.

Figure 10:
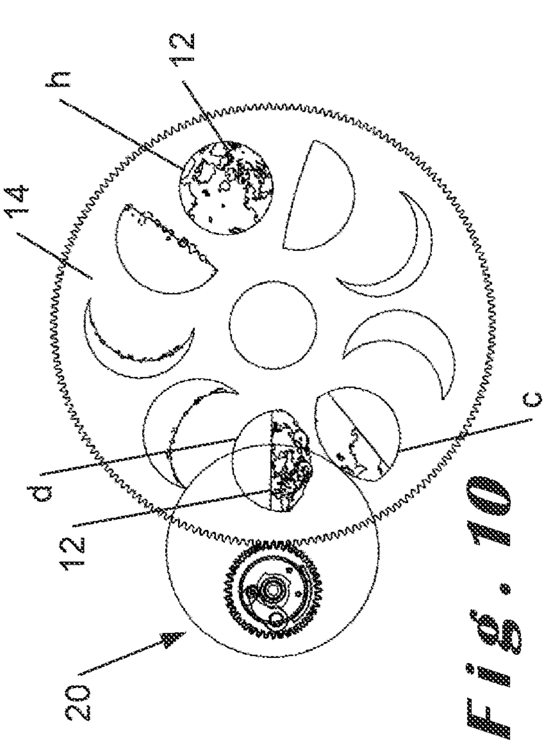
Figure 10A:
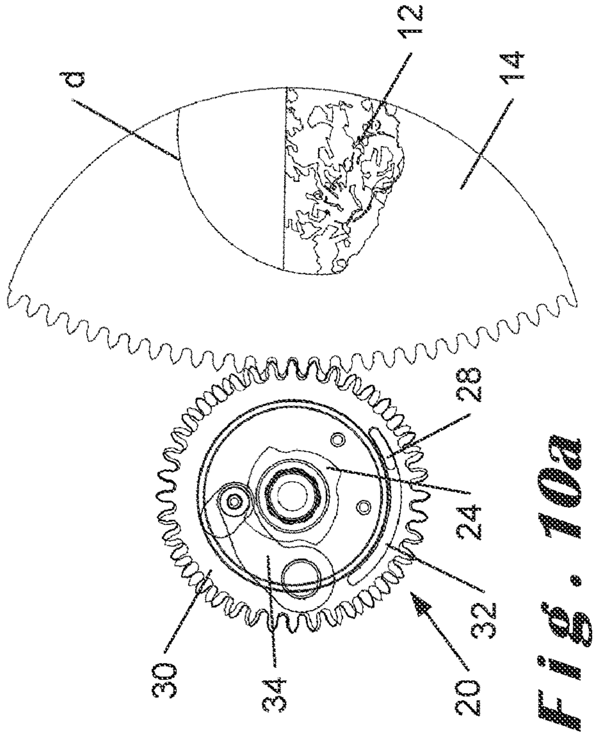
Figure 12:
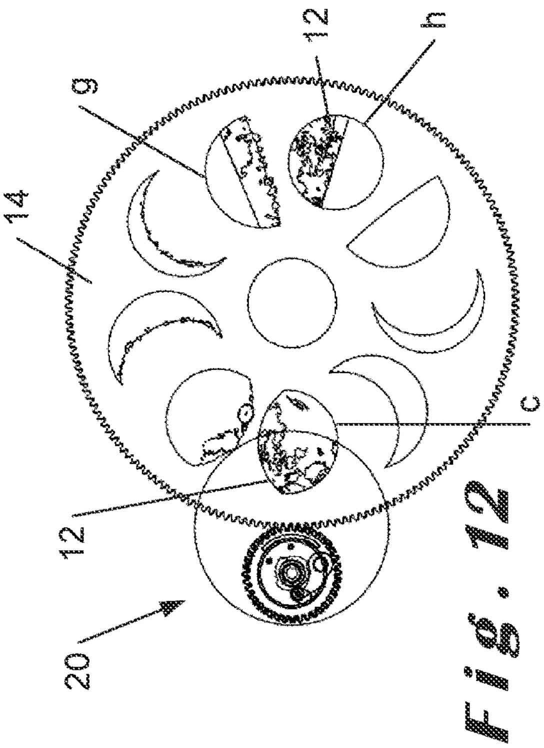
Figure 12A:
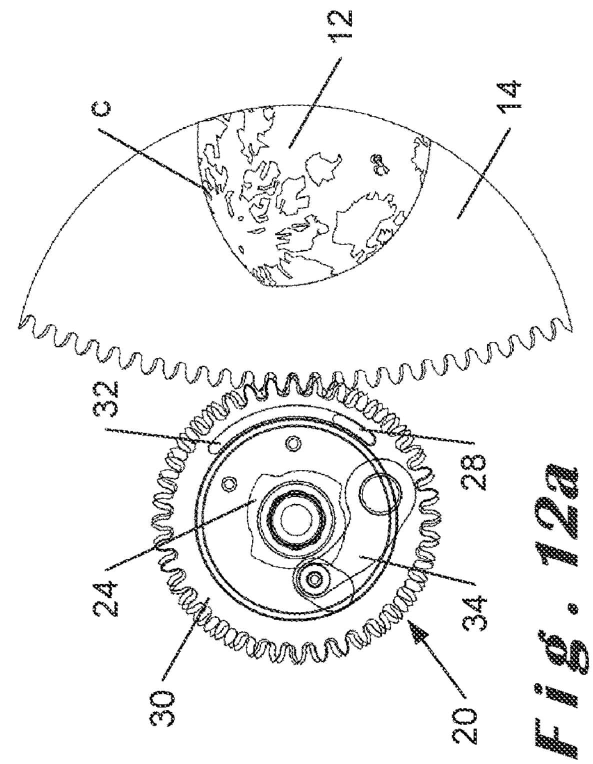

At the end of the display period, a few hours before the transition to the following moonphase, the full moon h has reached the right of the display aperture 6, namely the west, and on the other side of the central axis the other portion of lunar background 12 is out of phase both in moonphase profile d corresponding to the waxing gibbous moon and in moonphase profile c corresponding to the waning gibbous moon, masked under the left of said aperture 6, as depicted in FIGS. 10, 10*a*. The pin 28 is then in abutment in the bottom of the groove 32. Consequently, the second wheel 26 still driven by the first wheel and pinion 8 and the third wheel 30 rotate integrally. The jumper 34 mounted on the third wheel 30 is therefore forced out of its position at the bottom of the concavity in the profile of the cam 24.

Figure 11:
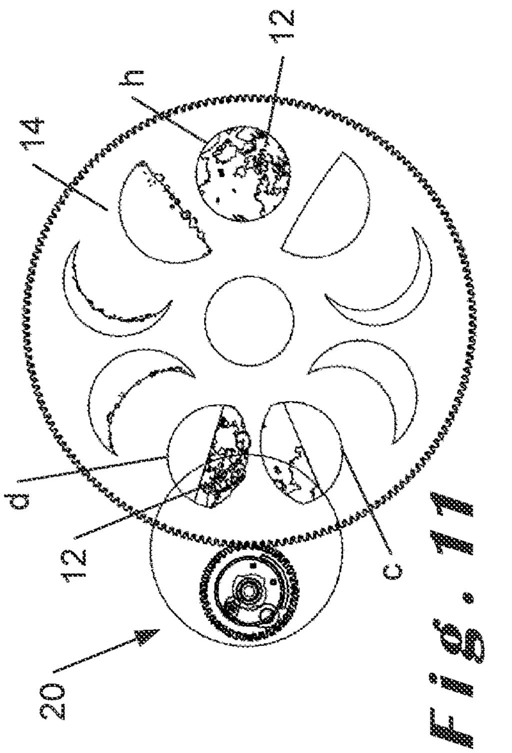
Figure 11A:
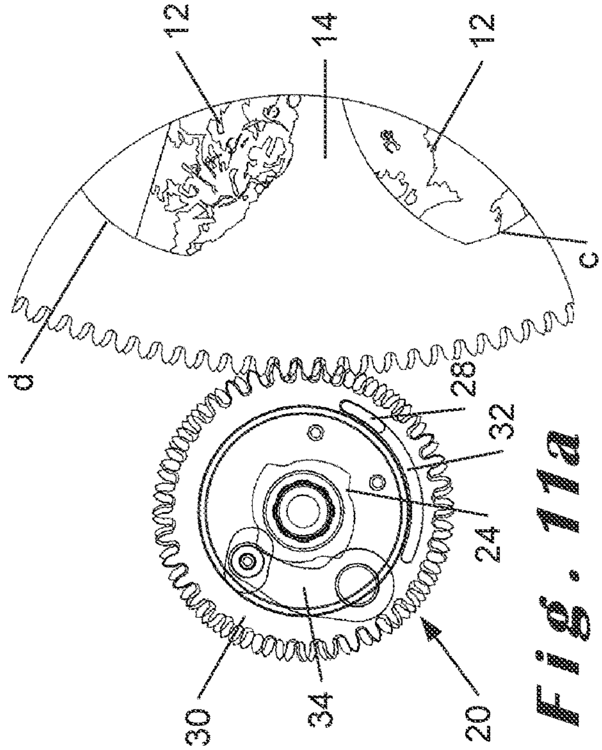

Since the first and second wheels and pinions 8, 14 each continue to rotate in clockwise direction, the full moon h is now hidden on the right under the display aperture 6. On the other side of the central axis, the following moonphase profile, namely the waning gibbous moon c, and the portion of lunar background 12 are approaching the left of the display aperture 6, while remaining masked under said aperture 6, corresponding to the transitional period between the full moon and the waning gibbous moon as depicted in FIGS. 11 and 11*a*. The jumper 34 has nearly reached the apex of the profile of the cam 24, while loading its spring 36. The energy stored by said spring 36 is sufficient to enable the jump to be made by suddenly releasing the stored energy to cause an instantaneous or very rapid relative rotation of the second wheel and pinion 14 in relation to the first wheel and pinion 8, and to finish in the position shown in FIGS. 12, 12*a*. During the jump, the first wheel and pinion 8 remains in a position nearly identical to the previous position. The third wheel 30, in contrast, has pivoted by 90° under the effect of unloading the spring 36 of the jumper 34. On rotating, the third wheel 30 has driven the second wheel and pinion 14 in rotation in clockwise direction, the gears being dimensioned to bring about an offset by a repositioning angle of 20° (360/2*9). During this offset, the following moonphase profile corresponding to the waning gibbous moon c, on the left of the central axis, is entirely superposed on the portion of lunar background 12 so as to reveal said following moonphase corresponding to the waning gibbous moon c, which is still masked under the display aperture 6. On the other side of the central axis, the other portion of lunar background 12 which is out of phase in relation to the moonphase profiles g and h is masked under the right of the display aperture 6. The pin 28 of the second wheel 26 is again positioned at the front in the groove 32 of the third wheel 30. After these steps representing ⅑$^{th}$ of a cycle, the mechanism is again ready to display in the aperture 6 the moonphase corresponding to the waning gibbous moon c, which will then move from left to right for 3.28 days, as described above.

The lunation cycle continues in the same way for each of the nine moonphases to be displayed. This results in particularly realistic visual representations of all the waxing and waning moonphases, both the concave and convex shapes, the D and reversed D shapes and a circular shape for the full moon, with realistic terminators, which move from left to right in the widened aperture 6, against a night-time background, so creating a contrast which provides the impression of a huge moon between its rising and setting on the horizon, as shown in FIGS. 13*a* to 13*i*: namely successively the full moon h shown in FIG. 13*a*, the waning gibbous moon c shown in FIG. 13*b*, the last quarter g shown in FIG. 13*c*, the waning moon b (penultimate crescent) shown in FIG. 13*d*, the last crescent f shown in FIG. 13*e*, the first crescent a shown in FIG. 13*f*, the waxing moon e (second crescent) shown in FIG. 13*g*, the first quarter i shown in FIG. 13*h*, and the waxing gibbous moon d shown in FIG. 13*i*.

Figure 13A:
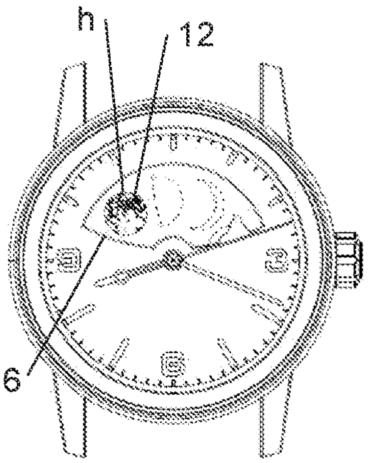
FIGS. 13*a* to 13*i* represent the various moonphases displayed by means of the display mechanism according to the invention, at different times in their display periods.
Figure 13B:
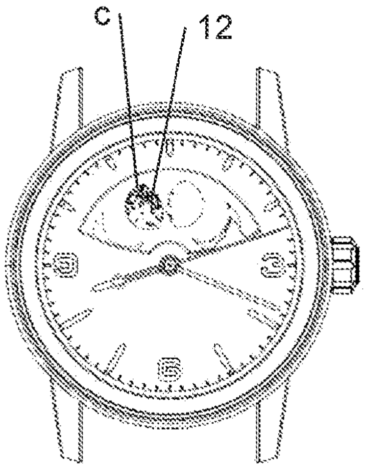
Figure 13C:
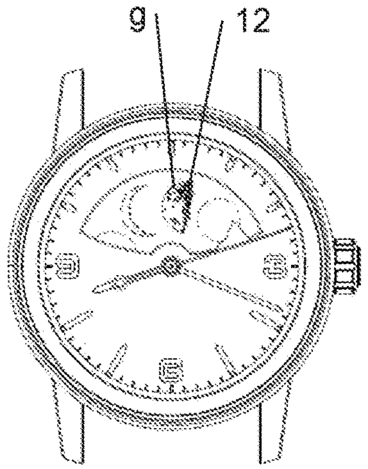
Figure 13D:
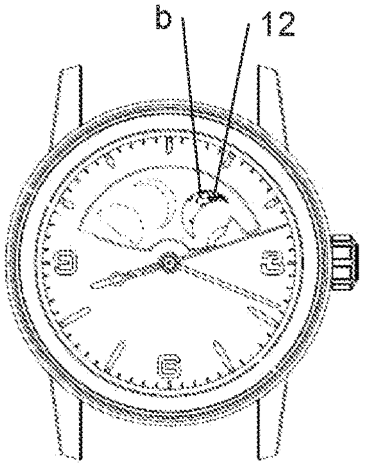
Figure 13E:
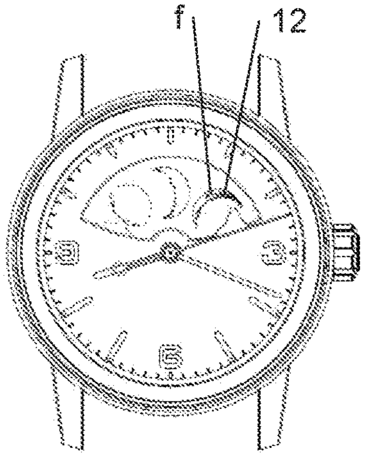
Figure 13F:
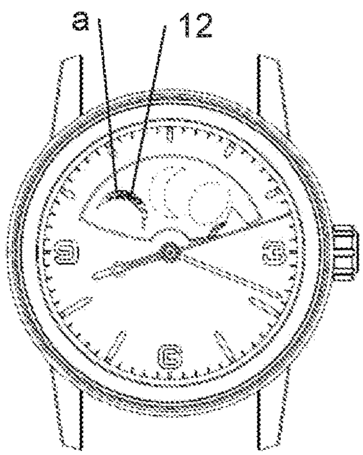
Figure 13G:
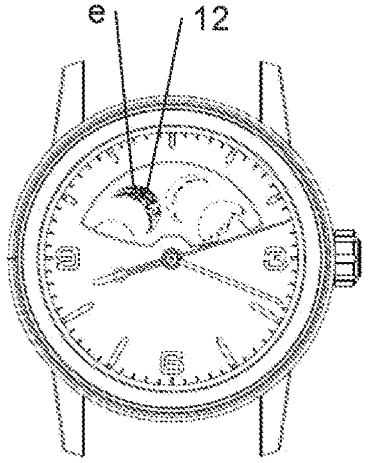
Figure 13H:
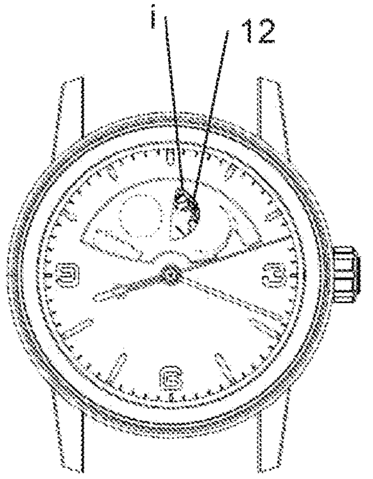
Figure 13I:
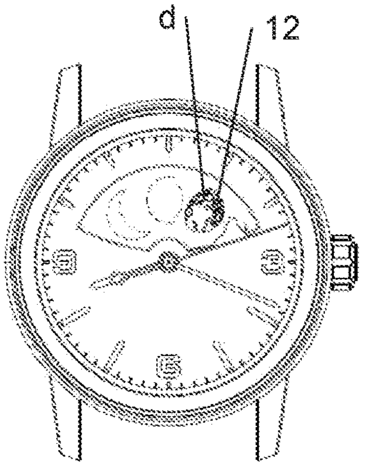

FIGS. 13*a* to 13*i* show the moonphases at different times in their display period in the aperture 6, for example FIG. 13*a* shows the full moon h at the start of its display period, FIG. 13*c* shows the last quarter g in the middle of its display period, and FIG. 13*e* shows the last crescent fat the end of its display period. Furthermore, the other moonphase profiles are shown in dashed lines to enhance understanding of the invention, but in reality they are not visible to a user, as a result of the night-time backgrounds 10 and 16 of the first and second wheels and pinions 8, 14 merging, as explained above.

Figure 14:
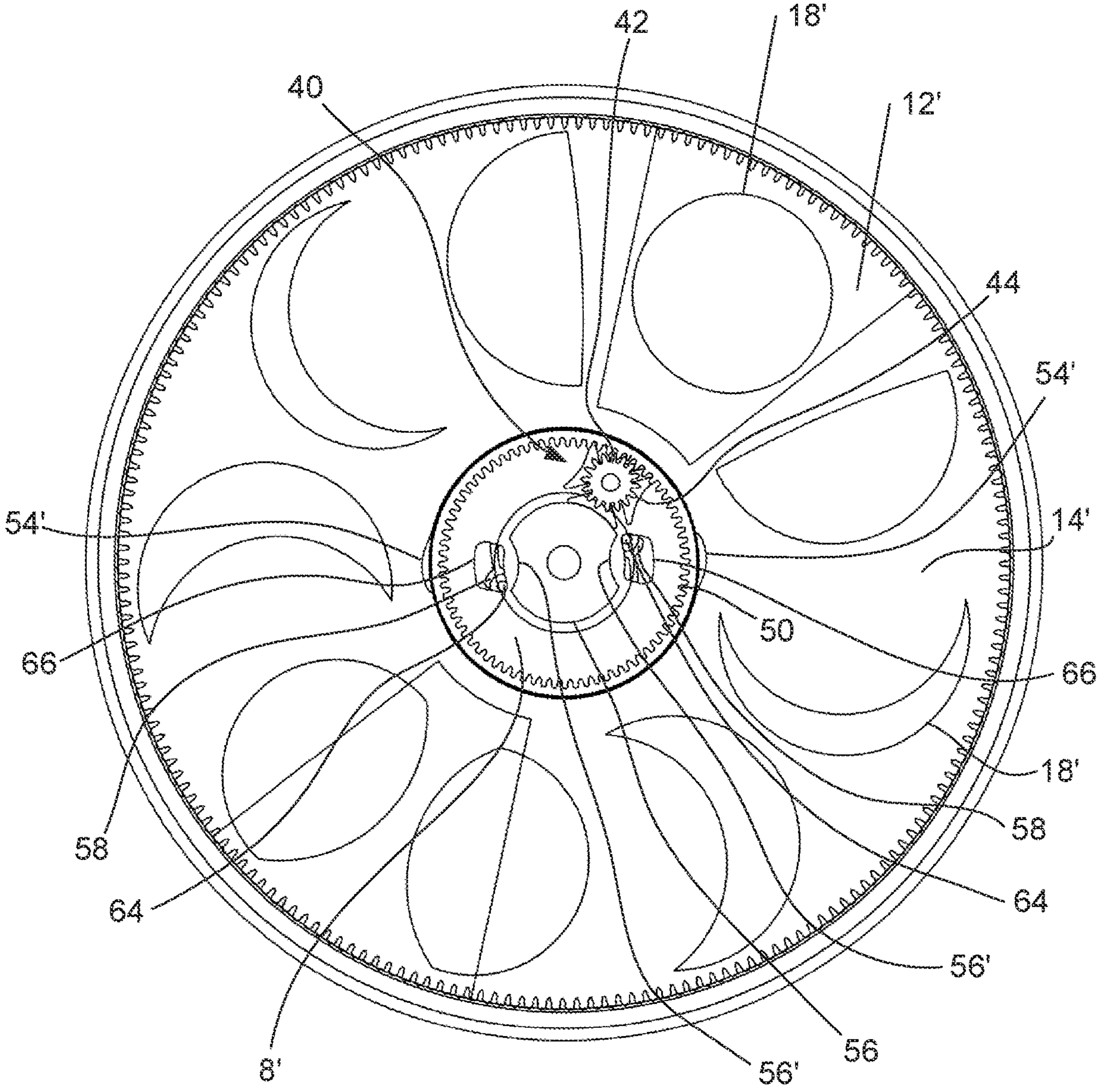
FIGS. 14 and 15 are respectively a plan view and an exploded view of the first and second wheels and pinions and of a second embodiment of the drive device.
Figure 15:
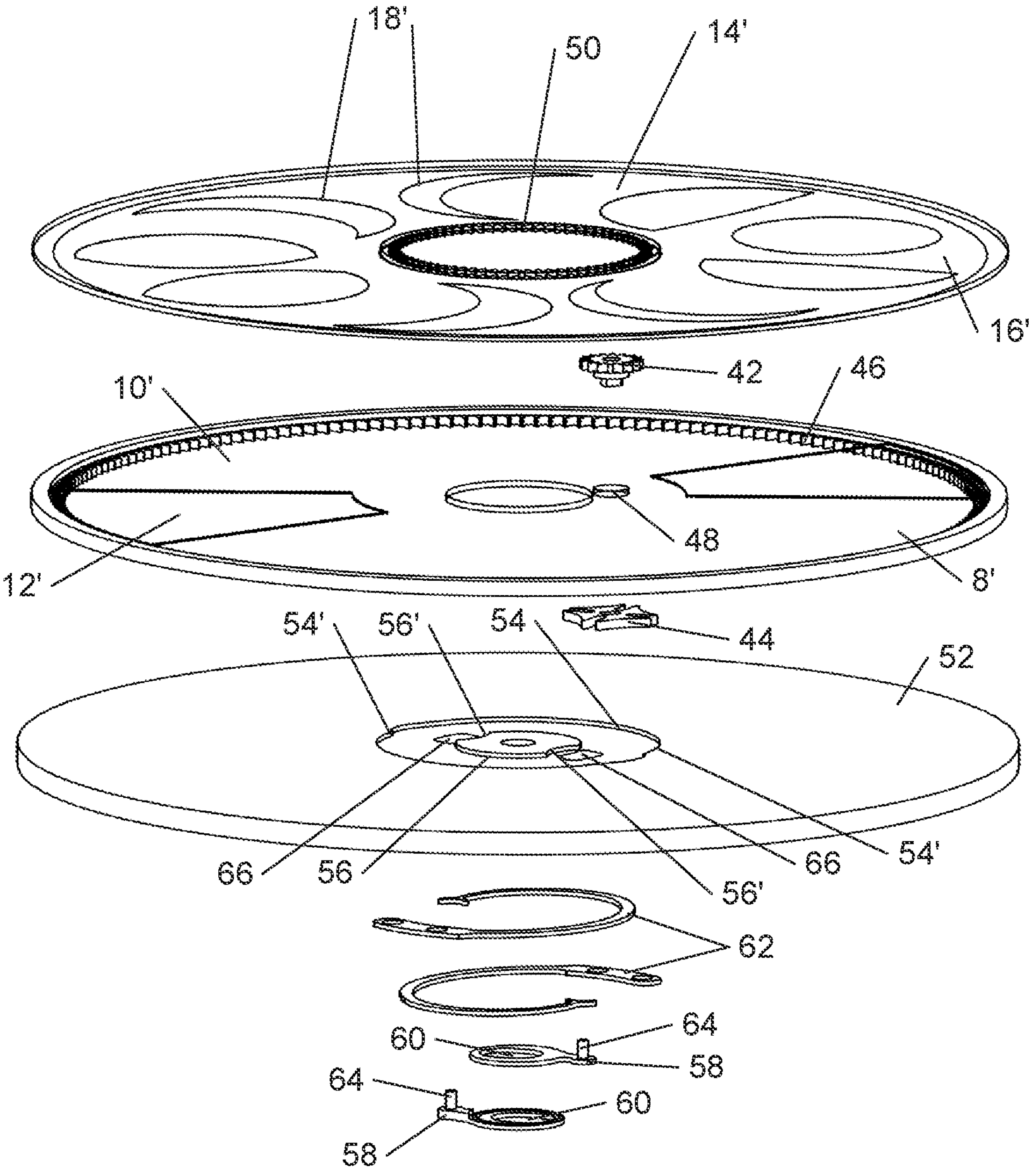
Figure 16:
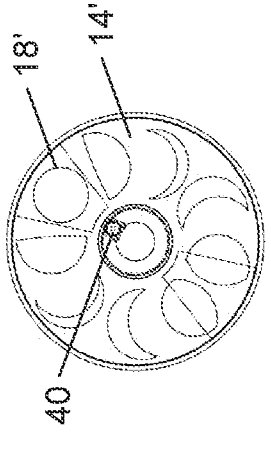
Figure 16A:
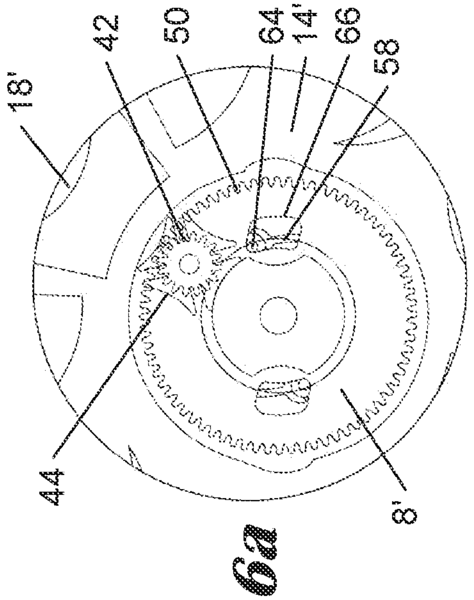

FIGS. 14 to 16 show a second embodiment of the drive device used in the invention.

In this embodiment, the drive device comprises a drive wheel and pinion 40 mounted on the first wheel and pinion 8' which is driven by the drive gear train, said drive wheel and pinion 40 comprising a drive wheel 42 arranged to cooperate with the second wheel and pinion 14', and a Maltese cross 44, said drive wheel and pinion 40 being arranged to be rotationally immobile in relation to said first wheel and pinion 8' for synchronised drive of the first and second wheels and pinions 8', 14' via the drive wheel 42 during the display period, and to be driven in rotation in relation to said first wheel and pinion 8' in order instantaneously to cause the drive wheel 42 to pivot in order to drive the second wheel and pinion 14' in rotation by the repositioning angle during the transitional period.

More specifically with reference to FIGS. 14 and 15, the first wheel and pinion 8' comprises a night-time background 10' and two symmetrically opposed lunar background portions 12' in a similar manner to the previously described exemplary embodiment. Furthermore, the first wheel and pinion 8' comprises, on its outer periphery, internal teeth 46 arranged to cooperate with the drive gear train (not shown) so as to drive the first wheel and pinion 8'. This configuration advantageously makes it possible to position the drive gear train under the mechanism.

The first wheel and pinion 8' carries the drive wheel and pinion 40, which comprises the drive wheel 42 in the form of a toothed pinion, and the Maltese cross 44, which is integral with the drive wheel 42. Thus, said drive wheel and pinion 40 rotates with the first wheel and pinion 8', in the manner of a satellite, around the centre of the mechanism. Furthermore, the drive wheel and pinion 40 is mounted pivotally for example in a bearing 48 drilled in the plate of the first wheel and pinion 8'. The Maltese cross 44 is positioned under the plate of the first wheel and pinion 8' so as to be able to cooperate with frame elements, as described below, and the drive wheel 42 is positioned above the plate of the first wheel and pinion 8' so as to be able to cooperate with the second wheel and pinion 14'.

The second wheel and pinion 14' comprises a night-time background 16' and moonphase profiles 18' in a similar manner to the previously described embodiment. Furthermore, the second wheel and pinion 14' is equipped, on its inner periphery, with teeth 50 arranged to cooperate with the drive wheel 42.

In order to establish the orientation of the Maltese cross 44, various elements for maintaining its position are provided on the frame 52 or on the movement's bottom plate. More particularly, the frame 52 is provided with a first outer cam profile 54 and a second inner cam profile 56 arranged coaxially with the centres C and C' of the first and second wheels and pinions 8', 14', such that said first and second cam profiles 54, 56 cooperate with the edges of the Maltese cross 44, with the exception of two protruding sectors 54' arranged symmetrically in relation to the central axis on the outer cam profile 54 and two hollow sectors 56' arranged symmetrically in relation to the central axis on the inner cam profile 56. The protruding sectors 54' and hollow sectors 56' are dimensioned to permit rotation of the Maltese cross 44. The protruding sector 54' of the outer cam profile 54 is substantially offset in relation to the hollow sector 56' of the opposing inner cam profile 56, such that the protruding sector 54' still prevents rotation of the Maltese cross 44 while the opposing hollow sector 56' would permit rotation of said Maltese cross 44.

Two levers 58 mounted pivotally under the frame about a shaft coaxial with the central axis are also provided. To this end, each lever 58 comprises an oblong-shaped opening 60 arranged to be disposed around said shaft such that each lever 58 is free to move away from the central axis. Each lever 58 is in contact with a return spring 62 mounted under the frame. Each lever 58 has at its free end a peg or pin 64 directed towards the Maltese cross 44 and arranged to pass through the frame via "banana" grooves 66 drilled in said frame in the space between the two cam profiles 54 and 56, so as to be able to locate itself in the bottom of a groove in the Maltese cross 44 when the lever 58 bearing it moves away from the central axis. The levers 58 are arranged symmetrically to one another in relation to said central axis, the instantaneous jump of the Maltese cross proceeding every 180° of rotation of the first wheel and pinion 8', as will be explained below. The combination of the shape of the banana grooves 66 and the effect of the return spring 62 establishes the rest position of the pin 64. According to another embodiment which is not shown, the pin 64 may be attached directly to the end of one arm of the return spring, the lever being omitted. The spiral shape of the return spring enables X and Y offset of the pin.

The operation of this second embodiment of this drive device is explained below with reference to FIGS. 16 to 20 which depict different positions at the end of the display period of the full moon and during the transitional period between the full moon and the waning gibbous moon.

Figure 16B:
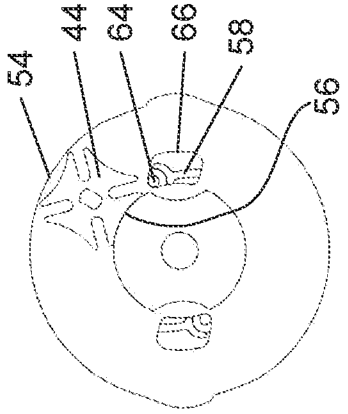

More particularly with reference to FIGS. 16, **16*a* and 16*b*, the moonphase profile 18' corresponding to the full moon is located towards the right of the display aperture (not shown) indicating the end of the display period of said full moon. During the moonphase display period, the second wheel and pinion 14' rotates integrally with the first wheel and pinion 8' via the drive wheel and pinion 40. This is because the Maltese cross 44 is locked in its orientation by the first, outer cam profile 54 and by the second, inner cam profile 56 provided on the frame 52, as is more specifically depicted in FIG. 16*b*. The first wheel and pinion 8' being driven in clockwise direction by the drive gear train by its teeth 46, said first and second wheels and pinions 8', 14' are driven synchronously at the same velocity and in the same direction, via the drive wheel 42 engaged with the teeth 50 of the second wheel and pinion 14' and integral with the Maltese cross 44 mounted on the first wheel and pinion 8'. The moonphase therefore moves in the aperture from left to right, as described above for the first exemplary embodiment, the first and second wheels and pinions 8', 14' moving closer to one of the levers 58. The return spring 62 is preferably prestressed to position the lever 58 and its pin 64 in the bottom of its banana groove 66**.

Figure 17:
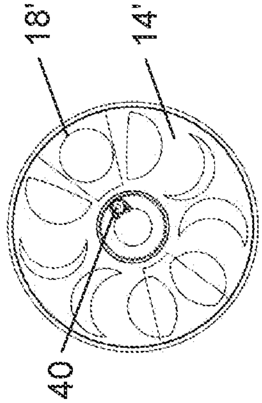
FIGS. 16 to 20 show the two wheels and pinions and the second embodiment of the drive device according to various movement sequences at the end of the display period of the full moon and during the transitional period between the full moon and the waning gibbous moon, FIGS. 16*a*, 16*b* to 20*a*, 20*b* being detail views of FIGS. 16 to 20 respectively.
Figure 17A:
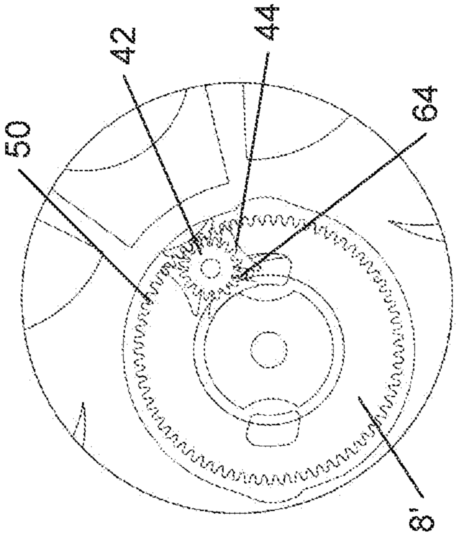
Figure 17B:
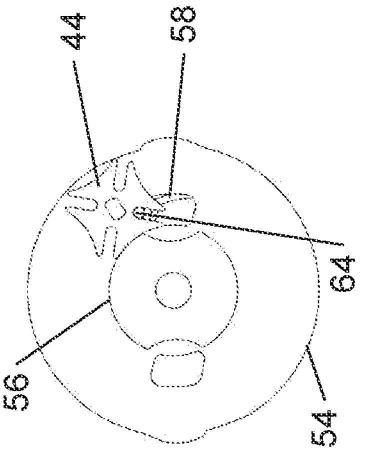

Approximately one day before the transitional period, the first wheel and pinion 8' has advanced such that the Maltese cross 44 comes into contact with the pin 64, as depicted in FIGS. 17, **17*a* and 17*b*. Due to the oblong shape of the opening 60 of the lever 58, said lever 58 is free to move away from the central axis such that its pin 64 is also offset to position itself at the bottom of the groove of the Maltese cross 44, as is more specifically depicted in FIG. 17*b*. Furthermore, said Maltese cross 44 is still locked in its orientation by the outer 54 and inner 56 cam profiles and cannot rotate about itself. When the Maltese cross 44 continues to advance with the first wheel and pinion 8', the return spring 62** starts to be loaded.

Figure 18:
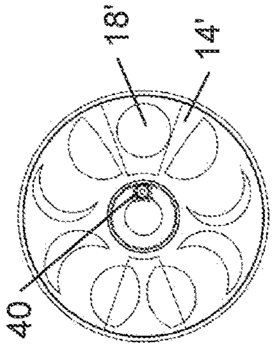
Figure 18A:
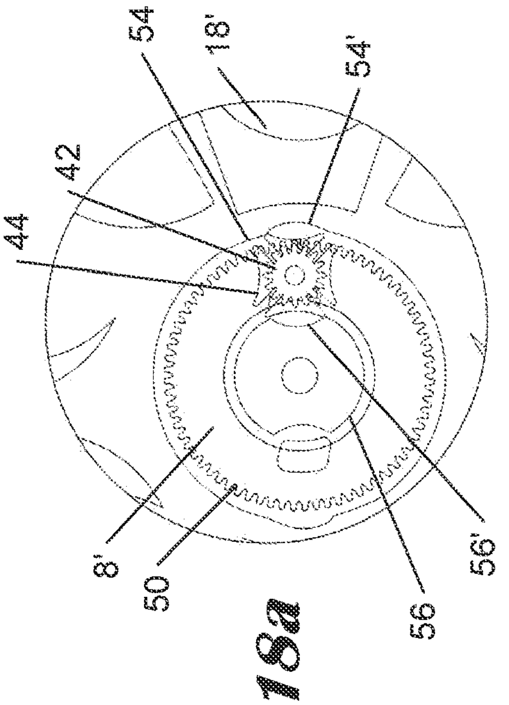
Figure 18B:
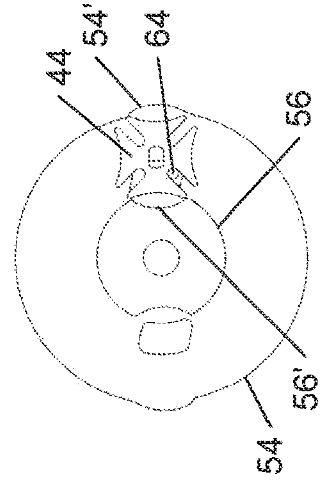

With reference to FIGS. 18, **18*a*, and 18*b*, at the end of the display period and at the start of the transitional period, the phase profile 18' of the second wheel and pinion 14' corresponding to the full moon has advanced to be hidden under the aperture. In parallel, the Maltese cross 44 has advanced with the first wheel and pinion 8' such that the return spring 62 and the pin 64 are at maximum extension. The Maltese cross 44 is positioned at the level of the hollow sector 56' of the inner cam profile 56, such that it is no longer retained by said inner cam profile 56, but still cannot rotate about itself, being just retained by the outer cam profile 54, at the edge of its protruding sector 54'**, ready to jump.

Figure 19:
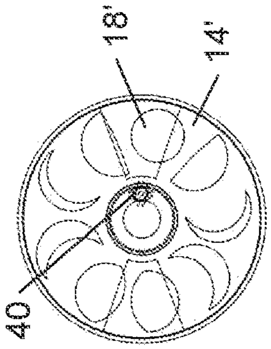
Figure 19A:
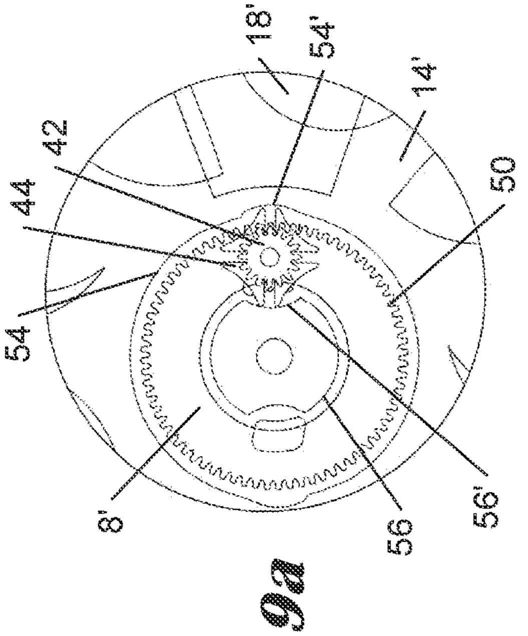
Figure 19B:
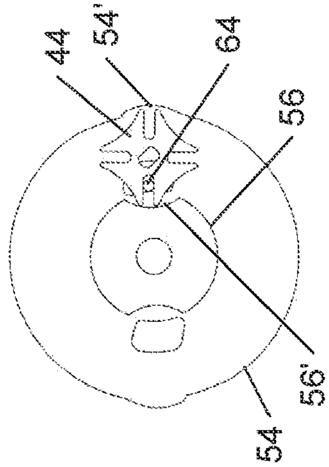

The Maltese cross 44 then continues to advance with the first wheel and pinion 8' such that it is positioned at the level of the protruding sector 54' of the outer cam profile 54, and is consequently free to pivot about itself. Under the effect of the suddenly unloading spring 62, the pin 64 rises back up to its equilibrium position, causing the Maltese cross 44 to rotate about itself by 90° relative to the first wheel and pinion 8', as depicted in FIGS. 19, **19*a*, and 19*b*. This rotation of the Maltese cross 44 causes the drive wheel 42 integral with said Maltese cross 44 to pivot, bringing about relative rotation of the second wheel and pinion 14' in clockwise direction by a repositioning angle of 20° via its teeth 50**.

Figure 20:
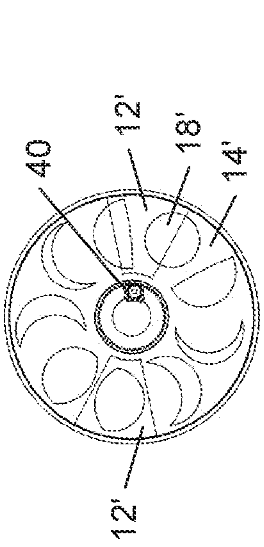
Figure 20A:
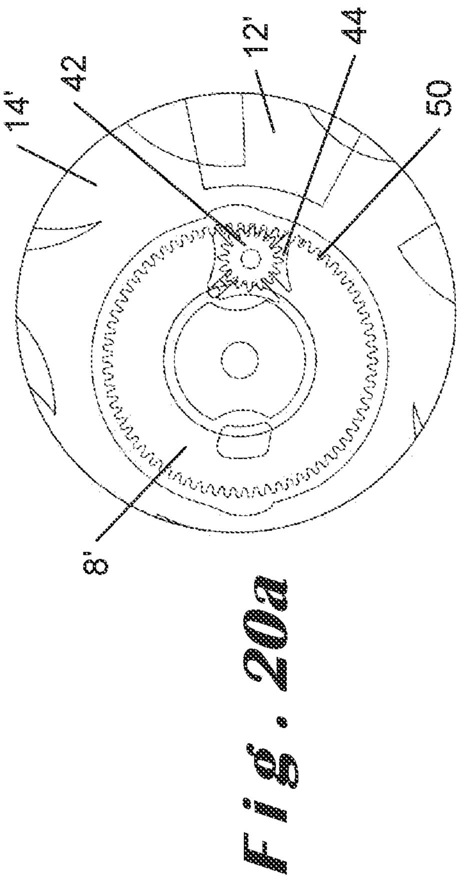
Figure 20B:
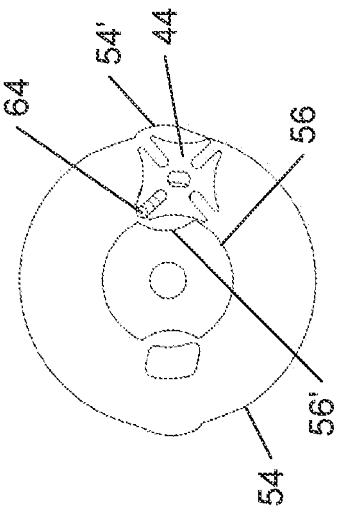

During this relative rotation of the second wheel and pinion 14', the following moonphase profile corresponding to the waning gibbous moon on the left of the central axis is entirely superposed on the portion of lunar background 12' so as to reveal said following moonphase corresponding to the waning gibbous moon, which is still masked under the display aperture, as depicted in FIG. 20. On the other side of the central axis, the other portion of lunar background 12' which is out of phase in relation to the moonphase profiles is masked under the right of the display aperture. The pin 64 and the return spring 62 are again in the rest position and the Maltese cross 44, which has continued to advance with the first wheel and pinion 8', is again locked in its orientation by the outer 54 and inner 56 cam profiles, as depicted in FIGS. **20*a* and 20*b*. The mechanism is again ready to display in the aperture the moonphase corresponding to the waning gibbous moon which will then move from left to right for 3.28 days, as described above. At the next jump, the Maltese cross 44 will cooperate with the opposite lever 58**.

According to another embodiment which is not shown, the drive device may be a differential, comprising an input wheel meshing with the first wheel and pinion 8, an output wheel meshing with the second wheel and pinion 14, and a second input arranged to bring about the offset between the wheels and pinions 8 and 14 during a transitional period.

Quite clearly, the first and second wheels and pinions may have configurations other than the examples given above, it being possible for the number of lunar background portions, moonphase profiles and moonphases to be displayed to vary. Furthermore, the mechanism of the invention may be adapted such that the relative rotation of the second wheel and pinion for offsetting it by the repositioning angle during the transitional period proceeds in the counter-clockwise direction.

The invention claimed is:

1. A display mechanism for n moonphases for a timepiece, where n is an integer greater than or equal to 3, comprising a first wheel and pinion having a night-time background and at least one portion of lunar background and a second wheel and pinion superposed on the first wheel and pinion, said second wheel and pinion having a night-time background and n moonphase profiles and the first wheel and pinion and the second wheel and pinion being pivoted about one and the same axis, wherein said display mechanism is arranged such that the first wheel and pinion is capable of being driven in rotation at a constant velocity, and that the second wheel and pinion is capable of being driven in rotation at the same angular velocity and in the same direction as the first wheel and pinion during a moonphase display period during which a portion of lunar background of the first wheel and pinion and a moonphase profile of the second wheel and pinion corresponding to the moonphase to be displayed are superposed to reveal said moonphase, and such that the second wheel and pinion is offset in relation to the first wheel and pinion by a repositioning angle during a transitional period between the current display period and the following display period in order to be able to reveal the following moonphase.

2. The display mechanism of claim 1, wherein n is odd.

3. The display mechanism according to claim 1, further comprising a dial including a display aperture of dimensions selected to show the movement of a moonphase during at least part of the moonphase's display period.

4. The display mechanism according to claim 3, wherein the display aperture is of dimensions selected to display at any time at most one moonphase in said display aperture.

5. The display mechanism according to claim 4, wherein said display aperture is of dimensions selected such that the remaining area of the dial masks the offset between the first wheel and pinion and the second wheel and pinion during the transitional period.

6. The display mechanism according to claim 3, wherein said display aperture is of dimensions selected such that the remaining area of the dial masks the offset between the first wheel and pinion and the second wheel and pinion during the transitional period.

7. The display mechanism according to claim 3, wherein the display aperture has a substantially annular shape, the radial edges of which form a horizon line.

8. The display mechanism according to claim 7, wherein the first wheel and pinion and the second wheel and pinion are capable of rotating in clockwise direction so as to represent the movement of a moonphase between its rising and setting on the horizon.

9. The display mechanism according to claim 7, wherein at least one of the radial edges of the display aperture has a shape selected to represent the profile of a mountain, a monument or a city.

10. The display mechanism according to claim 1, wherein the first wheel and pinion has x lunar background portions, x being greater than or equal to 1 and less than n, said x lunar background portions being regularly distributed on the first wheel and pinion.

11. The display mechanism according to claim 1, wherein the first wheel and pinion is arranged to be drivable by a drive gear train and to cooperate with a drive device, said drive device being arranged to drive the second wheel and pinion synchronously during the moonphase display period and to drive the second wheel and pinion in relative rotation in order to offset the second wheel and pinion by said repositioning angle during a transitional period.

12. The display mechanism according to claim 11, wherein the moonphase profiles of the second wheel and pinion are positioned in relation to one another depending on the selected direction of relative rotation of the second wheel and pinion, such that the following moonphase is displayed instead of the current moonphase when said second wheel and pinion is driven in relative rotation by the drive device in said selected direction of rotation.

13. The display mechanism according to claim 11, wherein the drive device comprises an energy accumulator arranged to be driven by the first wheel and pinion which is itself driven by the drive gear train, and arranged to cause the second wheel and pinion to jump forward under the action of said energy accumulator.

14. The display mechanism according to claim 13, wherein the energy accumulator comprises three coaxially superposed wheels, namely a first wheel arranged to be driven by the first wheel and pinion, said first wheel being integral with a cam, a second wheel arranged to be driven by said first wheel and pinion at a higher velocity than the first wheel, said second wheel bearing a pin, and a third wheel arranged to drive the second wheel and pinion, said third wheel comprising a groove in which the pin of the second wheel engages and bearing a jumper equipped with a jumper spring, said jumper being arranged to cooperate with the cam of the first wheel so as to cause the third wheel to rotate integrally with the first wheel for synchronised drive of the first wheel and pinion and of the second wheel and pinion while the pin of the second wheel is not in abutment in the groove of the third wheel, and so as to store energy when the pin of the second wheel in abutment in the groove of the third wheel causes the third wheel to rotate integrally with the second wheel and then to release said energy suddenly to cause the third wheel to pivot in order to drive the second wheel and pinion in relative rotation by the repositioning angle.

15. The display mechanism according to claim 11, wherein the drive device comprises a drive wheel and pinion mounted on the first wheel and pinion, said drive wheel and pinion comprising a drive wheel arranged to cooperate with the second wheel and pinion, and a Maltese cross, said drive wheel and pinion being arranged to be rotationally immobile in relation to said first wheel and pinion which is driven by the drive gear train for synchronised drive of the first wheel and pinion and of the second wheel and pinion via the drive wheel during the display period, and to be driven in rotation in relation to said first wheel and pinion in order to cause the drive wheel to pivot in order to drive the second wheel and pinion in rotation by the repositioning angle during the transitional period.

16. The display mechanism according to claim 11, wherein the first wheel and pinion comprises two symmetrically opposed lunar background portions and is arranged to be driven by the drive gear train at a velocity of n half-revolutions per lunation and wherein the drive device is arranged to drive the second wheel and pinion synchronously during the moonphase display period and to drive the second wheel and pinion relative rotation in order to offset the second wheel and pinion by said repositioning angle during a transitional period.

17. The display mechanism according to claim 16, wherein n is equal to 9, and wherein the first wheel and pinion comprises two symmetrically opposed lunar background portions and is arranged to be driven by the drive gear train in clockwise direction at a velocity of 9 half-revolutions per lunation, the second wheel and pinion being arranged to be offset in clockwise direction by a repositioning angle of 20° during the transitional period between one moonphase display period and the following moonphase display period, the moonphase display period being approximately 3.28 days, the display aperture extending over an angle of approximately 140°, and the moonphase profiles being arranged on the second wheel and pinion according to the sequence, in clockwise direction, first crescent, waning moon, waning gibbous moon, waxing gibbous moon, waxing moon, last crescent, last quarter, full moon, first quarter.

18. The display mechanism according to claim 1, wherein the moonphase profiles of the second wheel and pinion have a profile defined by the terminator corresponding to a moonphase and the arc of a circle of the outer edge of the moon.

19. The display mechanism according to claim 18, wherein the edge of the moonphase profile corresponding to the terminator comprises relief features illustrating details of the moon.

20. A timepiece comprising a display mechanism according to claim 1.

* * * * *